United States Patent
Ohashi et al.

[11] Patent Number: 6,112,268
[45] Date of Patent: Aug. 29, 2000

[54] SYSTEM FOR INDICATING STATUS OF A BUFFER BASED ON A WRITE ADDRESS OF THE BUFFER AND GENERATING AN ABORT SIGNAL BEFORE BUFFER OVERFLOWS

[75] Inventors: Masahiro Ohashi, Onaka; Takashi Yamamoto, Sasaguri; Toshihiro Moriiwa, Muromi, all of Japan

[73] Assignee: Matsushita Electric Industrial Co., Ltd., Osaka, Japan

[21] Appl. No.: 09/097,079

[22] Filed: Jun. 12, 1998

[30] Foreign Application Priority Data

Jun. 16, 1997 [JP] Japan .................................. 9-158836

[51] Int. Cl.[7] ............................ G06F 13/14; G06F 13/00; G06F 12/00
[52] U.S. Cl. .............................. 710/52; 710/57; 711/154; 711/156
[58] Field of Search ....................... 710/52, 57; 711/154, 711/156, 204

[56] References Cited

U.S. PATENT DOCUMENTS

| 4,692,894 | 9/1987 | Bemis ........................................ 364/900 |
| 4,975,858 | 12/1990 | Ikenoue et al. ........................... 364/519 |
| 5,648,777 | 7/1997 | Bays et al. ................................ 341/110 |
| 5,663,948 | 9/1997 | Kobunaya ................................. 370/229 |

FOREIGN PATENT DOCUMENTS

| 55-033282 | 3/1980 | Japan . |
| 58-161191 | 9/1983 | Japan . |
| 61-234149 | 10/1986 | Japan . |
| 8-223168 | 8/1996 | Japan . |

*Primary Examiner*—Thomas C. Lee
*Assistant Examiner*—Thuan Du
*Attorney, Agent, or Firm*—Wall Marjama Bilinski & Burr

[57] ABSTRACT

A buffer memory control device comprises a buffer memory which is divided into memory areas in cell units each consisting of plural pieces of data by addresses; a write address generation circuit for outputting a write address of the buffer memory; a read address generation circuit for outputting a read address of the buffer memory; a first register for decoding the write address, thereby outputting a flag signal indicating a write address before completion of writing data for each cell; a data decision circuit for deciding presence/absence of cell unit data in the buffer memory and performing read control of the buffer memory on the basis of the flag signal; a second register for decoding the read address, thereby indicating completion of reading data for each cell and outputting a flag reset signal for resetting the flag signal; and an overflow occurrence notification circuit for notifying a transfer source of overflow in the buffer memory on the basis of the flag signal, the data decision circuit performing read control of the buffer memory, and notifying a transfer source that transfer of write data should be aborted before the buffer memory overflows, and data being transferred for each cell, thereby avoiding loss of data.

6 Claims, 11 Drawing Sheets

SYSTEM FOR INDICATING STATUS OF A BUFFER BASED ON A WRITE ADDRESS OF THE BUFFER AND GENERATING AN ABORT SIGNAL BEFORE BUFFER OVERFLOWS

FIELD OF THE INVENTION

The present invention relates to a buffer memory control device which temporarily stores data in a buffer memory, and then performs data transfer.

BACKGROUND OF THE INVENTION

In general, a buffer memory is provided between two communication systems with different data transfer rates to control a data transfer rate. For instance, the buffer memory is used for the case where a rate at which a transfer source writes data to a buffer memory is higher than a rate at which a transfer destination reads data therefrom.

FIG. 8 is a block diagram showing a construction of a prior art buffer memory control device which temporarily stores data in a buffer memory, and then performs data transfer. Referring now to FIG. 8, a buffer memory (8 bit data input/output, 8 bit read/write address input, read/write enable input) 1 has a capacity of three cells (one cell=53 bytes, 1 byte=8 bits). A write address generation circuit 2 is used for generating a write address of the buffer memory 1. A write address 3 is generated by the write address generation circuit 2. Write data 4 is written to the buffer memory 1. A write enable signal 5 is used for making the buffer memory 1 writable. A read address generation circuit 6 is used for generating a read address of the buffer memory 1. A read address 7 is generated by the read address generation circuit 6. Read data 8 is read from the buffer memory 1. A read enable signal 9 is used for making the buffer memory 1 readable. An address comparison circuit 149 is used for comparing the write address 3 to the read address 7. Specifically, the comparison circuit 149 uses two adders to take the complement of 2, thereby performing subtraction. The comparison circuit 149 subtracts the read address 7 from the write address 3, thereby obtaining a subtraction result 150. An overflow occurrence notification circuit 151 is used for detecting occurrence of overflow in the buffer memory 1 when the subtraction result 150 changes "−1" into "0". An empty occurrence notification circuit 152 is used for detecting occurrence empty in the buffer memory 1 when the result 150 changes "+1" into "0".

FIG. 10(a), 10(b), and 10(c) show constructions of the address comparison circuit 149, the overflow occurrence notification circuit 151, and the empty occurrence notification circuit 152 in FIG. 8, respectively. Shown in FIG. 10(a) are exclusive-OR circuits $EX_{01} EX_{02}$, $EX_{11}$, $EX_{12}$, ..., $EX_{n1}$, and $EX_{n2}$, AND circuits $AD_{01}$, $AD_{02}$, $AD_{11}$, $AD_{12}$, ..., $AD_{n1}$, OR circuits $OR_{01}$, $OR_{11}$, ..., $OR_{n1}$, bits $A_0$, $A_1$, ..., $A_n$ forming a write address, bits $B_0$, $B_1$, ..., $B_n$ forming a read address, bits $S_0$, $S_1$, ..., $S_n$ of a subtraction result, and bits $C_0$, $C_1$, ..., $C_n$ of a carry.

Shown in FIG. 10(b) are a decoder 51a for decoding a subtraction result "0" of the address comparison circuit 149, a decoder 51b for decoding a subtraction result "−1", a flag register 51c set when the decoder 51b has detected "−1", and an AND circuit 51d for notifying a transfer source of occurrence of overflow when outputs of the decoder 51a and the flag register 51c are respectively high (H).

Shown in FIG. 10(c) are a decoder 52a for decoding a subtraction result "0" of the address comparison circuit 149, a decoder 52b for decoding a subtraction result "+1", a flag register 52c set when the decoder 52b has detected "+1", and an AND circuit 52d for notifying occurrence of overflow when outputs of the decoder 52a and the flag register 52c are respectively high (H).

Hereinafter, operation of the buffer memory control device 1 so constructed will be described. Referring to FIG. 8 again, the buffer memory 1, when the write enable signal 5 is at low level (hereinafter referred to as L level), writes the write data 4 onto the write address 3 output from the write address generation circuit 2 in synchronization with a write clock (not shown). The write address generation circuit 2 sequentially outputs addresses 0~158 starting with 0 in synchronization with the write clock when the write enable signal 5 is at L level.

The buffer memory 1, wherein the read enable signal 9 is at L level, reads the read data 8 from the read address 7 output from the read address generation circuit 6 in synchronization with a read clock (not shown). The read address generation circuit 6 sequentially outputs addresses 0~158 starting with 0 in synchronization with the read clock when the read enable signal 9 is at L level.

In order to detect occurrence of overflow in the buffer memory 1, the address comparison circuit 149 subtracts the read address 7 from the write address 3, and outputs the subtraction result 150 to the overflow occurrence notification circuit 151 and the empty occurrence notification circuit 152. The subtraction result takes a positive value in normal operation, since a value of a write address is larger than that of a read address. However, if overflow occurs, as shown in FIG. 9(a), a write address WAD passes through a read address RAD, reaches the highest address in a memory area, and then goes back to the lowest address therein, from which it is increased toward the read address RAD. Therefore, the overflow occurrence notification circuit 151 detects overflow when the subtraction result 150 changes from "−1" to "0". On the other hand, if empty occurs, as shown in FIG. 9(b), the read address RAD catches up with the write address WAD, and therefore the empty generation notification circuit 152 detects empty when the result 150 changes from "+1" to "0", and then makes reading stop.

In the prior art buffer memory control device, there have been shortcomings with its use, which will be described below. In a case where cell unit data, i.e., a data set consisting of plural pieces of data, is being written onto a buffer memory, and transfer of the data is aborted prematurely, in order to read the written data therefrom, pseudo data is inserted into the cell as the following data, thereby performing data transfer. In a receiving end, however, the cell unit including the pseudo data is abandoned. Consequently, loss of transmitted data occurs.

As mentioned previously, overflow or empty is detected by the address comparison circuit 149 in FIG. 10(a). The address comparison circuit 149 includes a subtraction circuit which subtracts a read address B from a write address A by performing "A+(two's complement of B)+1", so that an increase in the number of bits of an address results in a large-scale circuit. In addition to this, the prior art buffer memory control device must be provided with the overflow occurrence notification circuit which comprises two decoders, the flag resister, and the AND circuit as shown in FIG. 10(b), and detects overflow when the subtraction result changes from "−1" into "0", or the empty occurrence notification circuit which comprises two decoders, the flag register, and the AND circuit as shown in FIG. 10(b), and detects empty when the subtraction changes "+1" into "0".

Further, in order to notify a transfer source that transfer of write data is aborted after overflow has occurred in the buffer memory, it is required that write data before aborting transfer be retransmitted, which beings about loss of the write data before aborting transfer, or loss of data resulting from overwriting onto the buffer memory.

One solution to these problems is to use a cell buffer control circuit, which is disclosed in Japanese Published Patent Application No. Hei- 8-223168, and which has been developed. FIG. 11 shows a construction of this cell buffer memory control circuit. Referring to FIG. 11, the cell buffer memory control circuit comprises a decoder 105 for decoding a write bank address 101, a decoder 106 for decoding a read bank address 103, information holding means 1091~109n for holding information indicating whether cell data is present in respective banks, an addition circuit 112 for adding "1" to a value of the write bank address 101, a selector 114 for selecting one of outputs 1101~110n from the information holding means 1091~109n on the basis of the value of the addition circuit 112, an addition circuit 113 for adding "1" to a value of the read bank address 103, a selector 115 for selecting one of outputs 1101~110n from the information holding means 1091–109n on the basis of the value of the addition circuit 113, and abnormal condition detecting means 116 for detecting an abnormal condition of the cell buffer.

In this cell buffer control circuit, the whole cell buffer is divided into n banks, and a write address or a read address is intended for each of the n banks. The information holding means 1091–109n is provided in the corresponding banks, respectively. The decoder 105, at the detection of write termination of cell data onto each bank, input "write termination" to the corresponding information holding means by the use of the write bank address 101 and the bank write termination signal 102, thereby setting a flag therein to indicate there is cell data. The decoder 106, at the completion of reading cell data from each bank, releases the flag held in the corresponding information holding means by the use of the read bank address 103 and the read termination signal 104. Thereby, each information holding means shows whether cell data is written to the corresponding bank and is present therein, or cell data is read therefrom and is not present therein.

By using the value resulting from adding "1" to the write bank address 101 as a control signal of the selector 114, the selector 114 selects one of the outputs 1101~110n from the information holding means 1091~109n. It follows from the fact that the selector 114 does not select information holding means in a bank to which data should be written but one in a next bank. Accordingly, when a signal 117 output from the selector 114 is H, the cell buffer overflows. For this reason, the signal 117 is used as a write inhibit signal for the cell buffer.

Besides, by using the value resulting from adding "1" to the read bank address 103 as a control signal of the selector 115, the selector 115 selects one of the outputs 1101~110n from the information holding means 1091~109n. It follows from this fact that the selector 115 does not select information holding means in a bank from which data should be read but one in a next bank. Accordingly, when a signal 118 output from the selector 115 is L, the cell buffer is empty. For this reason, a reverse signal of the signal 118 is used as a read inhibit signal for the cell buffer.

However, this prior art cell buffer control circuit has also drawbacks. The circuit checks information of the information holding means in the next bank, thereby controlling overflow and underflow. Hence, as soon as writing to the bank starts, the circuit outputs a detection result indicating that the bank is about to overflow or underflow, which tends to occur because effective use of the capacity of the cell buffer is not realized with fewer banks. For instance, in case of two banks, only half of a whole capacity of the cell buffer is made use of. As a result, controlling data transfer with the use of the detection of overflow or underflow output from the circuit, results in poor efficiency in transfer.

In addition, the circuit copes with banks of a fixed length.

SUMMARY OF THE INVENTION

It is an object of the present invention to provide a buffer memory control device with improved efficiency in transfer when used in control of data transfer, which can detect overflow in a buffer memory without increasing a size of a circuit, or can detect overflow in the buffer memory in advance and notify a receiving end of overflow.

Other objects and advantages of the invention will become apparent from the detailed description that follows. The detailed description and specific embodiments described are provided only for illustration since various additions and modifications within the spirit and scope of the invention will be apparent to those skilled in the art from the detailed description.

According to a first aspect of the present invention, a buffer memory control device comprises a buffer memory which is divided into memory areas in cell units each consisting of plural pieces of data by addresses; a write address generation circuit for outputting a write address of the buffer memory; a read address generation circuit for outputting a read address of the buffer memory; a first register for decoding the write address, thereby outputting a flag signal indicating a write address before completion of writing data for each cell; a data decision circuit for deciding presence/absence of cell unit data in the buffer memory and performing read control of the buffer memory on the basis of the flag signal; a second register for decoding the read address, thereby indicating completion of reading data for each cell and outputting a flag reset signal for resetting the flag signal; and an overflow occurrence notification circuit for notifying a transfer source of overflow in the buffer memory on the basis of the flag signal, the data decision circuit performing read control of the buffer memory, and notifying a transfer source that transfer of write data should be aborted before the buffer memory overflows, and data being transferred for each cell, thereby avoiding loss of data.

Therefore, the buffer memory is divided into areas in cell units and data is transferred for each cell. In addition, overflow and empty are respectively controlled, whereby loss of data is avoided. Further, overflow in the buffer memory is detected with no use of a comparison circuit, whereby a reduced size circuit is realized.

According to a second aspect of the present invention, in the buffer memory control device of the first aspect, a pseudo data generation circuit for receiving a flag signal as an input, performing read control of the buffer memory and outputting a pseudo data selection signal and pseudo data in cell units when there is no cell unit data in the buffer memory; and a select circuit for selecting one of the pseudo data and the read data output from the buffer memory on the basis of the pseudo data selection signal.

Therefore, the whole data is not abandoned at a transfer destination, whereby loss of data is avoided.

According to a third aspect of the present invention, in the buffer memory control device of the first aspect further comprises a register which is externally set to present an address value of the buffer memory externally; a first match detection circuit for detecting a match between the value of the register and the write address; and a second match detection circuit for detecting a match between the value of the register and the read address; the buffer memory being divided into memory areas in arbitrary units.

Therefore, overflow in the memory areas into which the buffer memory is divided in arbitrary units can be detected.

According to a fourth aspect of the present invention, a buffer memory control device comprises a buffer memory which is divided into memory areas in cell units each consisting of plural pieces of data by addresses; a write address generation circuit for outputting a write address of the buffer memory; a read address generation circuit for outputting a read address of the buffer memory; a first register for decoding the write address, thereby outputting a flag signal indicating one of a write address at the completion of writing cell unit data and a write address before completion of the writing; a data decision circuit for deciding presence/absence of cell unit data in the buffer memory and performing read control of the buffer memory on the basis of the flag signal; a second register for decoding the read address, thereby indicating completion of reading data for each cell and outputting a flag reset signal for resetting the flag signal; and an overflow occurrence detection circuit for receiving a flag signal and a write address as inputs and notifying a transfer source that transfer of write data should be aborted before overflow occurs on the basis of the flag signal and the write address, the data decision circuit performing read control of the buffer memory, and notifying a transfer source that transfer of write data should be aborted before the buffer memory overflows, and data being transferred for each cell, thereby avoiding loss of data.

Therefore, the buffer memory is divided into cell units, and data is transferred for each cell. Overflow and empty are controlled. Thereby, loss of cell data is avoided. Besides, overflow can be detected in advance.

According to a fifth aspect of the present invention, the buffer memory control device of the fourth aspect, further comprises a pseudo data generation circuit for receiving a flag signal as an input, performing read control of the buffer memory and outputting a pseudo data selection signal and pseudo data for each cell when there is no cell unit data in the buffer memory; and a select circuit for one of the pseudo data and the read data output from the buffer memory on the basis of the pseudo data selection signal.

Therefore, the whole cell is not abandoned at a transfer destination, whereby loss of cell data is avoided.

According to a sixth aspect of the present invention, the buffer memory control device of the fourth aspect further comprises a register which is externally set to present an address value of the buffer memory externally; a first match detection circuit for detecting a match between the value of the register and a write address; and a second match detection circuit for detecting a match between the value of the register and a read address, the buffer memory being divided into memory areas in arbitrary units.

Therefore, overflow in memory areas into which the buffer memory is divided in arbitrary units can be detected.

DETAILED DESCRIPTION OF THE PREFERRED EMBODIMENTS

Now, preferred embodiments of the present invention will be described with reference to FIGS. 1 to 5.

Embodiment 1

In this first embodiment, a write address and a read address of a buffer memory are decoded by decoders, thereby setting or resetting plural flag registers for the corresponding cells, and outputs of these flag registers are ANDed, whereby overflow of a buffer memory can be detected with a small-scale circuit.

Figure 1:
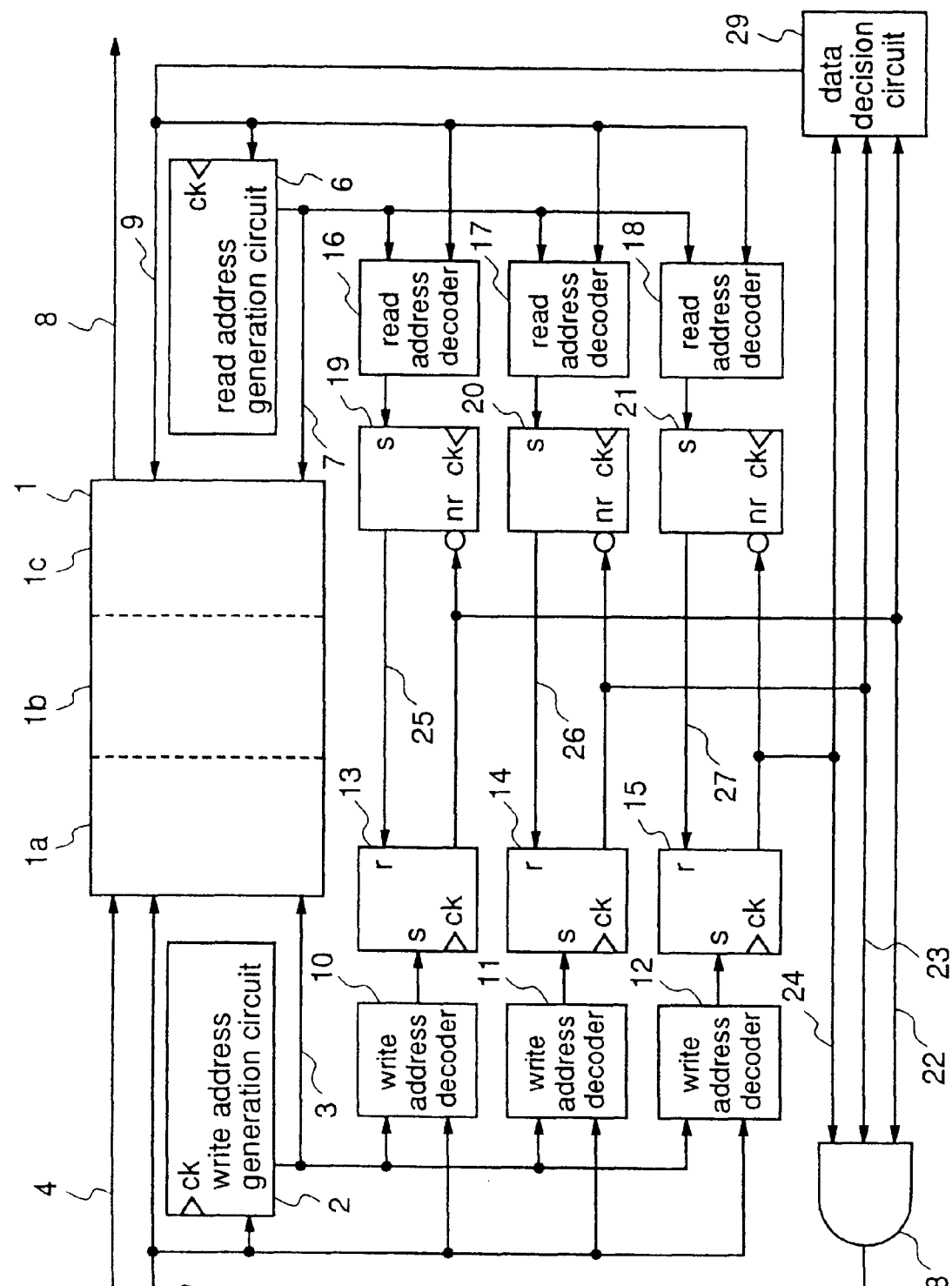
FIG. 1 is a block diagram showing a construction of a buffer memory control device according to a first embodiment of the present invention.

FIG. 1 is a block diagram showing a construction of a buffer memory control device according to a first embodiment of the present invention. Referring now to FIG. 1, a buffer memory (8 bit data input/output, 8 bit read/write address input, read/write enable input) 1 has a capacity of three cells (one cell=53 bytes, 1 bite–8 bits). One or a plurality of memories may be provided.

A write address generation circuit 2 is used for generating a write address of the buffer memory 1. A write address 3 is generated by the write address generation circuit 2. Write data 4 is written to the buffer memory 1. A write enable signal 5 is used for making the buffer memory 1 writable. A read address generation circuit 6 is used for generating a read address of the buffer memory 1. A read address 7 is generated by the read address generation circuit 6. Read data 8 is read from the buffer memory 1. A read enable signal 9 is used for making the buffer memory 1 readable. These components and data are identical to those if FIG. 6 in the prior art example.

Write address decoders 10–12 are used for decoding write addresses generated by the write address generation circuit 2, and detecting match/mismatch between the write addresses and the highest addresses in memory areas 1a–1c, respectively. Flag registers 13–15 are set by the write address decoders 10–12, respectively. Read address decoders 16–18 are used for decoding read addresses generated by the read address generation circuit 6, and detecting match/ mismatch between the read addresses and the highest addresses in memory areas $1a$–$1c$, respectively. Flag reset registers 19–21 are set by the read address decoders 16–18, indicating the corresponding memory areas $1a$–$1c$ are empty at the setting, respectively. Flag signals 22–24 are output from the flag registers 13–15, indicating the corresponding memory areas $1a$–$1c$ are full when they are at H level, and is used for resetting the corresponding flag reset registers 19–21 when at L level, respectively. Flag reset signals 25–27 are output from the flag reset registers 19–21, indicating the corresponding memory areas $1a$–$1c$ are empty, and is used for resetting the corresponding flag registers 13–15 when at H level, respectively. An overflow occurrence notification circuit 28 includes a 3-input AND circuit, and is used for notifying a transfer source of occurrence of overflow in the buffer memory 1 when the flag signals 22–24 are all H. A data decision circuit 29 is used for deciding that at least one of the flag signals 22–24 is H, and generating a write enable signal 9 at that point in time, which may include an exclusive-OR circuit.

Figure 2:
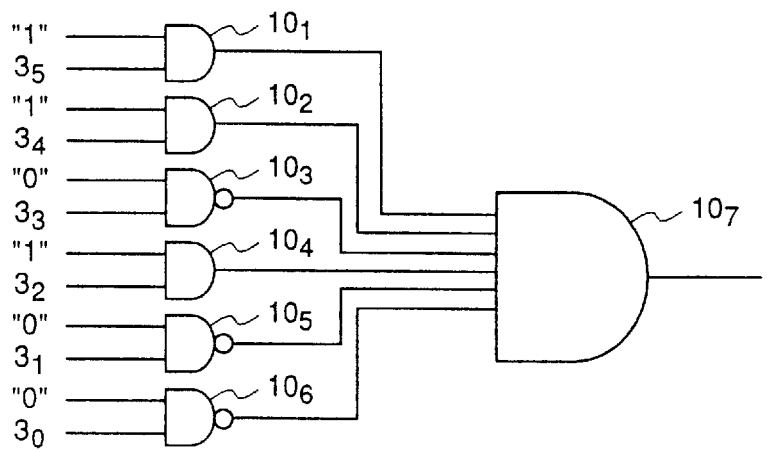
FIGS. 2(a)–2(c) are block diagrams showing a construction of a decoder of the buffer memory control device of the first embodiment.
Figure 2:
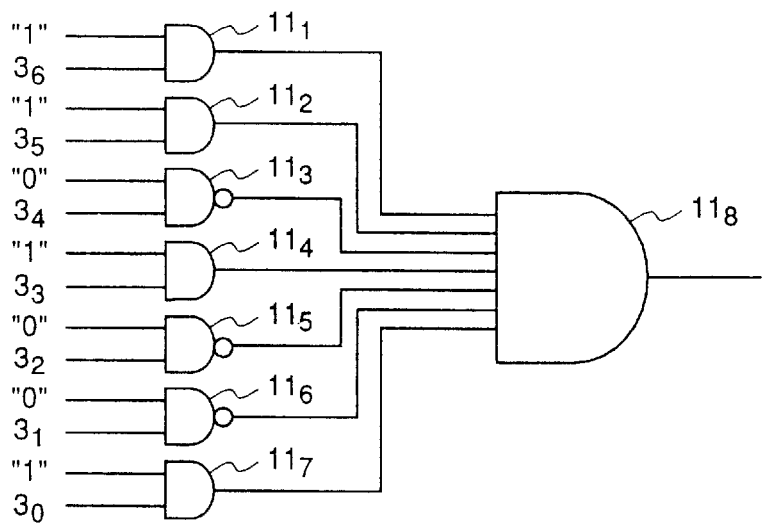
Figure 2:
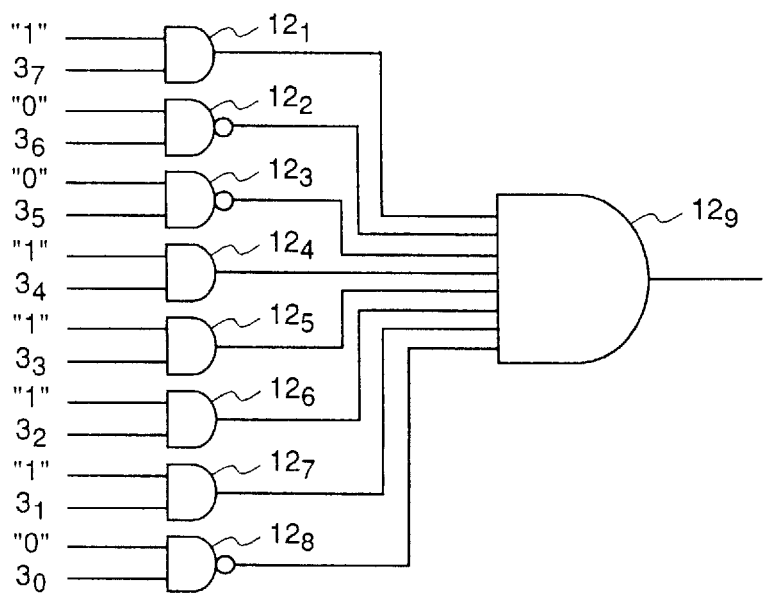

FIGS. 2($a$)–2($c$) are diagrams showing examples of the decoders in FIG. 1. In these illustrated examples, addresses "52", "105", and "158" are decoded, respectively.

Referring to FIG. 2($a$), there is shown a decoder which can detect a match between the data input to the write address 3 and "52". Shown in FIG. 2($a$) are an AND circuit $10_1$ for ANDing data "1" and a 5th bit $3_5$ of a write address 3, and AND circuit $10_2$ for ANDing data "1" and a 4th bit $3_4$ of the write address 3, an AND circuit $10_3$ for ANDing data "0" and a 3rd bit $3_3$ of the write address 3, and AND circuit $10_4$ for ANDing data "1" and a 2nd bit $3_2$ of the write address 3, and AND circuit $10_5$ for ANDing data "0" and a 1st bit $3_1$ of the write address 3, an AND circuit $10_6$ for ANDing data "0" and a 0-th bit $3_0$ of the write address 3, and an AND circuit $10_7$ for ANDing outputs of AND circuits $10_1$–$10_6$.

In this decoding circuit, when data input to the write address 3 matches data 52, the data is expanded to binary and given as "1", "1", "0", "1", "0", and "0", which are input to the fifth bit $3_5$, the fourth bit $3_4$, the third bit $3_3$, the second bit $3_2$, the first bit $3_1$, the 0-th bit $3_0$ of the write address 3 in the AND circuits $10_1$–$10_6$, respectively. These matches "1", "1", "0", "1", "0", and "0", which has been given to the AND circuits $10_1$–$10_6$, respectively, and therefore outputs of the AND circuits $10_1$–$10_6$ are all H, whereby an output of the AND circuit $10_7$ is H. Thereby, a match between the data input to the write address 3 and "52" can be detected.

Referring to FIG. 2($b$), there is shown a decoder which can detect a match between the data input to the write address 3 and "105", as in the case shown in FIG. 2($a$).

Shown in FIG. 2($b$) are an AND circuit $11_1$ for ANDing data "1" and a 6th bit $3_6$ of the write address 3, an AND circuit $11_2$ for ANDing data "1" and a 5th bit $3_5$ of the write address 3, an AND circuit $11_3$ for ANDing data "0" and a 4th bit $3_4$ of the write address 3, an AND circuit $11_4$ for ANDing data "1" and a 3rd bit $3_3$ of the write address 3, an AND circuit $11_5$ for ANDing data "0" and a 2nd bit $3_2$ of the write address 3, an AND circuit $11_6$ for ANDing data "0" and a 1st bit $3_1$ of the write address 3, an AND circuit $11_7$ for ANDing data "1" and a 0-th bit $3_0$, and an AND circuit $11_8$ for ANDing outputs of the AND circuits $11_1$–$11_7$.

Referring to FIG. 2($c$), there is shown a decoder which can detect a match between the data input to the write address 3 and "158", as in the case shown in FIG. 2($a$).

Shown in FIG. 2($c$) are an AND circuit $12_1$ for ANDing data "1" and a 7th bit $3_7$ of the write address 3, an AND circuit $12_2$ for ANDing data "0" and a 6th bit $3_6$ of the write address 3, an AND circuit $12_3$ for ANDing data "0" and a 5th bit $3_5$ of the write address 3, an AND circuit $12_4$ for ANDing data "1" and a 4th bit $3_4$ of the write address 3, an AND circuit $12_5$ for ANDing data "1" and a 3rd bit $3_3$ of the write address 3, an AND circuit $12_6$ for ANDing data "1" and a 2nd bit $3_2$ of the write address 3, an AND circuit $12_7$ for ANDing data "1" and a 1st bit $3_1$ of the write address 3, an AND circuit $12_8$ for ANDing data "0" and a 0-th bit $3_0$ of the write address 3, and an AND circuit $12_9$ for ANDing outputs of AND circuits $12_1$–$12_8$.

Operation of the buffer memory control device thus constructed will now be described.

Referring to FIG. 1 again, the buffer memory 1, when the write enable 5 is at L level, writes write data 4 onto the write address 3 output from the write address generation circuit 2 in synchronization with a write clock (not shown).

The write address generation circuit 2 sequentially outputs addresses 0–158 starting with 0 when the write enable signal 5 is at L level.

The write address decoders 10, 12, and 12 respectively decode the write address 3, and outputs an H level signal when the write address 3 matches 52, 105, and 158 each indicating the highest address of one cell in the buffer memory 1. Specifically, the write address decoders 10, 11, and 12, when the data of one cell has been written to the buffer memory 1, that is, at the completion of writing onto the addresses 52, 105, and 158, starting with address 0 of the write address 3, outputs decoded H level signals to the corresponding flag registers 13, 14, and 15, with set flag signals 22, 23, and 24 to be at H level, respectively.

Meanwhile, the buffer memory 1, when a read enable signal 9 is at L level, reads read data 8 from a read address 7 output from the read address generation circuit 6 in synchronization with a read clock (not shown).

The read address generation circuit 6 sequentially outputs addresses 0–158 starting with 0 in synchronization with the read clock when the read enable signal 9 is at L level.

The read address decoders 16, 17, and 18 respectively decode the read address 7, and output an H level signal when the read address 7 matches 52, 105, and 158 each indicating the highest address of one cell in the buffer memory 1. Specifically, the read address decoders 16, 17, and 18, when respective data of the corresponding cells has been read from the buffer memory 1, that is, at the completion of reading from the addresses 52, 105, and 158, starting with address 0 of the read address 7, outputs decoded H level signals to the corresponding flag registers 19, 20, and 21, respectively.

The flag reset registers 19, 20, and 21 output flag reset signals 25, 26, and 27 for resetting the flag registers 13, 14, and 15, respectively, at H level. The flag reset registers 19, 20, and 21 output the flag reset signals 25, 26, and 27 at H level, to the corresponding flag registers 13, 14, an 15, respectively until they are reset, and then enter L level.

If the flag signals 22, 23, and 24 are at H level, then writing data onto the corresponding memory areas $1a$, $1b$, and $1c$ is completed. Therefore, only when one or more of the flag signals 22, 23, and 24 are at H level, the data decision circuit 29 outputs the read enable signal 9.

Thus, the data decision circuit 29 allows data to be read from the buffer memory 1 only when one or more of the flag signals 22, 23, and 24 are at H level, thereby transferring data cell by cell. Therefore, even if data to the buffer memory 1 runs out in the middle of transferring a cell, pseudo data is inserted into the cell for formation of the cell at a transfer source, so that the cell is not abandoned at a transfer destination. As a result, loss of cell data is avoided.

In addition, if the flags 22, 23, and 24 are all at H level, then writing data onto the corresponding memory areas 1a, 1b, and 1c is completed. Therefore, by the use of the overflow occurrence notification circuit 28 including 3-input AND circuit, overflow in the buffer memory 1 can be detected.

For example, in a case where the buffer memory control device is applied to ATM (Asynchronous Transfer Mode), with a synchronous circuit shown in FIG. 1, values to be decoded by the write address decoders 10, 11, and 12 are set to be smaller than the 52, 105, and 158, for example 47, 100, and 153 smaller than the 52, 105, and 158 by 5, respectively, are set, while with an asynchronous circuit, 48, 101, and 154 smaller than the 52, 105, and 154 by 4, are set, whereby overflow in the buffer memory 1 can be detected in advance.

Thus, in accordance with the first embodiment, a write address input to the buffer memory is decoded cell by cell, thereby setting the flag registers, and a read address input to the buffer memory is decoded cell by cell, thereby setting the flag reset registers, whose outputs reset the flag registers, respectively, overflow is detected when outputs of the flag registers in the buffer memory are all at H level. Therefore, the buffer memory control device offers improved efficiency when used for transfer control of data. In addition, address decoders, address registers, and an AND circuit are used to form the circuit, and therefore a small-scale circuit is realized, in contrast with the prior art example wherein comparison is made between a write address and a read address to obtain difference which changes from "−1" to "0" or "+1" to "0", and change of the difference is detected. Besides, presence/absence of data in the buffer memory is detected for each cell. Further, an address to-be-decoded by a write address decoder is set as an address before th highest address of a cell by one, whereby overflow can be detected in advance before it does occur.

Embodiment 2

In this second embodiment, a write address and a read address are decoded by decoders, thereby setting or resetting plural flag registers of the corresponding memory areas, and the state in which outputs of these flag registers are H except one of a flag register, and a write address in a memory area of the flag register is about to overflow is detected by decoders, whereby overflow in the buffer memory can be detected in advance before it does occur.

Figure 3:
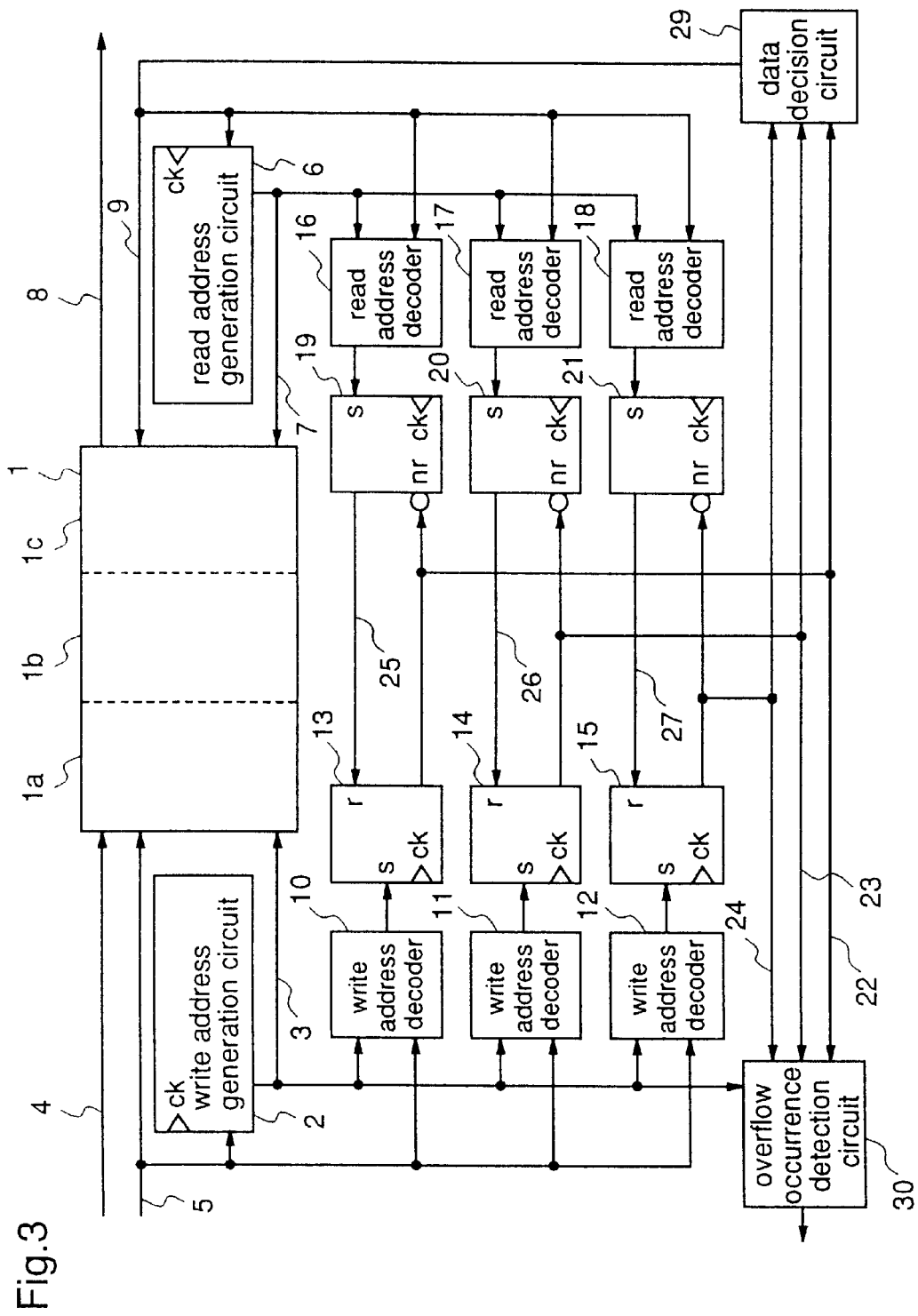
FIG. 3 is a block diagram showing a structure of a buffer memory control device according to a second embodiment of the present invention.

FIG. 3 is a block diagram showing a construction of a buffer memory control device according to a second embodiment of the present invention.

In the figure, a buffer memory 1, a write address generation circuit 2, a write address 3, write data 4, a write enable signal 5, a read address generation circuit 6, a read address 7, read data 8, a read enable signal 9, write address decoders 10–12, flag registers 13–15, read address decoders 16–18, flag registers 19–21, flag signals 22–24, flag reset signals 25–27, and a data decision circuit 29 are virtually identical to those of the corresponding parts shown in FIG. 1 of the first embodiment. An overflow occurrence detection circuit 30 comprises the same decoder as shown in FIG. 2, and is used for notifying the transfer source of occurrence of overflow in the buffer memory at the decoding of the state in which the flag signals 22–24 are at H level except one for the corresponding memory area to which data is being written and a write address in the corresponding memory area matches a prescribed address close to the highest address.

Operation of the buffer memory control device thus constructed will now be described.

Referring to FIG. 3 again, the buffer memory 1, when the write enable signal 5 is at L level, writes write data 4 onto the write address 3 output from the write address generation circuit 2 in synchronization with a write clock (not shown).

The write address generation circuit 2 sequentially outputs addresses 0–158 starting with 0 when the write enable signal 5 is at L level.

The write address decoders 10, 11, and 12 respectively decode the write address 3, and outputs an H level signal when the address 3 matches 52, 105, and 158 each indicating the highest address of one cell in the buffer memory 1, respectively. Specifically, the write decoders 10, 11, and 12, when respective data of the corresponding cells has been written to the buffer memory 1, that is, at the completion of writing onto the addresses 52, 105, and 158, starting with address 0 of the write address 3, respectively outputs a decoded H level signal to the corresponding flag registers 13, 14, and 15, which set flag signals 22, 23, and 24 to be at H level, respectively.

Meanwhile, the buffer memory 1, when a read enable signal 9 is at L level, reads read data 8 from an read address 7 output from the read address generation circuit 6 in synchronization with a read clock (not shown).

The read address generation circuit 6 sequentially outputs addresses 0–158 of a read address 7 generated by the read address generation circuit 6 starting with 0 when the read enable signal 9 is at L level.

The read address decoders 16, 17, and 18 respectively decode the read address 7, and output an H level signal when the read address 7 matches the 52, 105, and 158 each indicating the highest address of one cell in the buffer memory 1. Specifically, the read address decoders 16, 17, and 18, when respective data of the corresponding cells has been read from the buffer memory 1, that is, at the completion of reading from the addresses 52, 105, and 158, starting with address 0 of the read address 7, respectively output a decoded H level signal to the corresponding flag registers 19, 20, and 21, respectively.

The flag reset registers 19, 20, and 21 set flag reset signals 25, 26, and 27 for resetting the flag registers 13, 14, and 15, respectively, to be at H level. The flag reset registers 19, 20, and 21 output the flag reset signals 25, 26, and 27 at an H level, to the corresponding flag registers 13, 14, an 15, respectively until they are reset, and then respectively enter L level.

Only when one or more of the flag signals 22, 23, and 24 are at H level, the data decision circuit 29 outputs the read enable signal 9.

Thus, the data decision circuit 29 allows data to be read from the buffer memory 1 only when one or more of the flag signals 22, 23, and 24 are at H level, thereby transferring data cell by cell. Therefore, even if data to the buffer memory 1 runs out in the middle of transferring a cell, pseudo data is inserted into the cell for formation of the cell, so that the cell is not abandoned at a transfer destination. As a result, loss of cell data is avoided.

Besides, the overflow occurrence detection circuit 30 detects the state in which two of the flag signals 22, 23, and 24 are at H level, and an address in a memory area to which data is being written has not reached the highest address in the memory area. Therefore, the circuit 30 can notify the transfer source of overflow in the buffer memory 1 before it does overflow, thereby aborting transfer of write data. As a result, loss of write data is avoided.

Assume that two of the flag signals 22, 23 and 24 are at H level, and a write address reaches 47 before the highest address 52 in a memory area 1a to which data is being written, the overflow occurrence detection circuit including a decoder is set as shown in FIG. 2 to detect occurrence of overflow in advance, whereby loss of write data can be avoided.

Thus, in accordance with the second embodiment, a write address input to the buffer memory is decoded cell by cell, thereby setting the flag registers, a read address input to the buffer memory is decoded cell by cell, thereby setting the flag reset registers, whose outputs reset the flag register, overflow is detected by decoding the state in which outputs of the flag registers are at H level except one for a memory area to which data is being written, and a write address in the memory area is before the highest address. Therefore, presence/absence of data in the buffer memory can be detected cell by cell, and use of the buffer memory control device in transfer control of data improves efficiency. Besides, it is possible to detect overflow in advance.

Embodiment 3

In this third embodiment, a write address and a read address are decoded by decoders, thereby setting or resetting plural flag registers of the corresponding memory areas, the state in which outputs of these flag registers are H except one of a flag register, and a write address in a memory area of the flag register is about to overflow is detected by decoders, and when outputs of these flag registers are all L, pseudo data to-be-abandoned at a transfer destination is sent, whereby overflow in the buffer memory can be detected in advance before it does occur, and simultaneously transmission of wrong data can be avoided.

Figure 4:
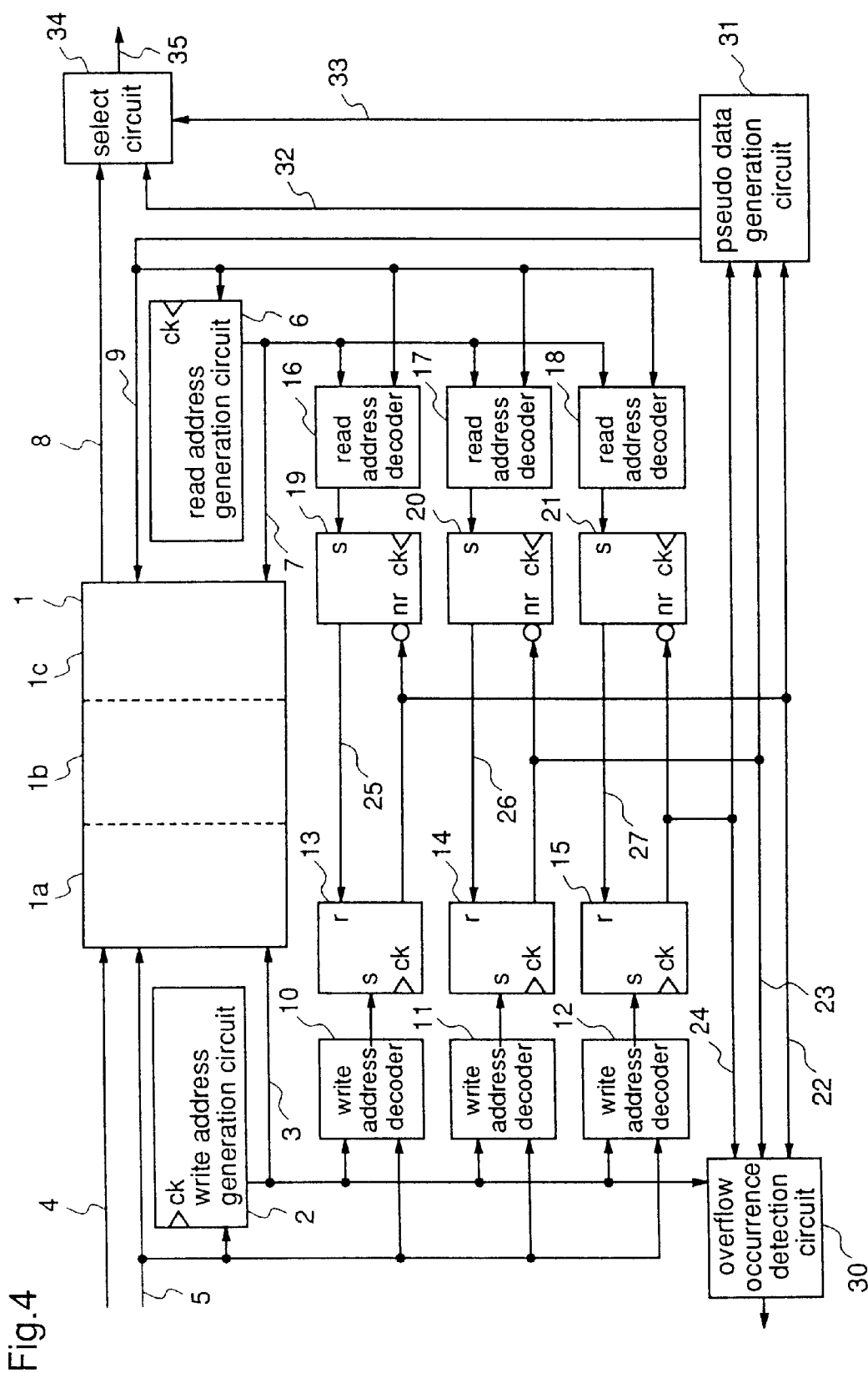
FIG. 4 is a block diagram showing a construction of a buffer memory control device according to a third embodiment of the present invention.

FIG. 4 is a block diagram showing a construction of a buffer memory control device according to a third embodiment of the present invention.

In the figure, a buffer memory 1, a write address generation circuit 2, a write address 3, write data 4, a write enable signal 5, a read address generation circuit 6, a read address 7, read data 8, a read enable signal 9, write address decoders 10–12, flag registers 13–15, read address decoders 16–18, flag registers 19–21, flag signals 22–24, flag reset signals 25–27, and an overflow occurrence detection circuit 30 are virtually identical to those of the corresponding parts shown in FIG. 3 of the second embodiment. A pseudo data generation circuit 31 is used for outputting the read enable signal 9 only when one or more of the flag signals 22, 23, and 24 are H, thereby allowing reading of data, and for generating pseudo data to-be-abandoned at a transfer destination only when the flag signals 22, 23, and 24 are all L. Pseudo data 32 is generated by the pseudo data generating circuit 31. A select circuit 34 is used for selecting one of the read data 8 output from the buffer memory 1 and the pseudo data 32. A pseudo data selection signal 33 is used for making the select circuit 34 perform selection. Transfer data 35 is data selected by the select circuit 34 and transferred to a transfer destination.

Operation of the buffer memory control device thus constructed will now be described.

Referring to FIG. 4 again, the buffer memory 1, when the write enable signal 5 is at L level, writes write data 4 onto the write address 3 output from the write address generation circuit 2 in synchronization with a write clock (not shown).

The write address generation circuit 2 sequentially outputs addresses 0–158 starting with 0 when the write enable signal 5 is at L level.

The write address decoders 10, 11, and 12 respectively decode the write address 3, and outputs an H level signal when the write address 3 matches the addresses 52, 105, and 158 each indicating the highest address of one cell in the buffer memory 1. Specifically, the write decoders 10, 11, and 12, when respective data of the corresponding cells has been written to the buffer memory 1, that is, at the completion of writing onto the addresses 52, 105, and 158, starting with address 0 of the write address 3, outputs decoded H level signals to the corresponding flag registers 13, 14, and 15, which set flag signals 22, 23, and 24 to be H level, respectively.

Meanwhile, the buffer memory 1, when the read enable signal 9 is at L level, reads read data 8 from a read address 7 output from the read address generation circuit 6 in synchronization with a read clock (not shown).

The read address generation circuit 6 sequentially outputs addresses 0–158 of the read address 7 starting with 0 when the read enable signal 9 is at L level.

The read address decoders 16, 17, and 18 respectively decode the read address 7, and outputs an H level signal when the read address 7 matches the addresses 52, 105, and 158 each indicating the highest address of one cell in the buffer memory 1, respectively. Specifically, the read address decoders 16, 17, and 18, when respective data of the corresponding cells has been read from the buffer memory 1, that is, at the completion of reading from the addresses 52, 105, and 158, starting with address 0 of the read address 7, outputs decoded H level signals to the corresponding flag reset registers 19, 20, and 21, respectively.

The flag reset registers 19, 20, and 21 set flag reset signals 25, 26, and 27 for resetting the flag registers 13, 14, and 15, to be at H level, respectively. The flag reset registers 19, 20, and 21 output the flag reset signals 25, 26, and 27 at H level, to the corresponding flag registers 13, 14, an 15, respectively, until they are reset, and then respectively enter L level.

Only when one or more of the flag signals 22, 23, and 24 are at H level, the pseudo data generation circuit 31 outputs the read enable signal 9. Thereby, data can be read from the buffer memory 1.

Thus, data is read from the buffer memory 1 only when one or more of the flag signals 22, 23, and 24 are at H level, thereby transferring data cell by cell. Therefore, even if data to the buffer memory 1 runs out in the middle of transferring a cell, pseudo data is inserted into the cell to compensate for lack of the data for formation of the cell at the transfer source, so that the cell is not abandoned at the transfer destination. As a result, loss of cell data can be avoided.

In addition, when the flag signals 22, 23, and 24 are at L level, pseudo data termed "empty cell", i.e., the pseudo data 32 in cell unit to-be-abandoned at the transfer destination, and the pseudo data selection signal 33 are output from the pseudo data generation circuit 31, and thereby transfer data 35 is switched from the read data 8 to the pseudo data 32, by the select circuit 34, to be output to the transfer destination.

The pseudo data generation circuit 31, which has transferred the empty cell, decides again whether one or more of the flag signals 22, 23, and 24 are at H level, and when at H level, it allows data to be read from the buffer memory 1, whereas when they are all at L level, it transfers the empty cell. This operation is repeated to avoid transfer of wrong data.

Besides, the overflow occurrence detection circuit 30 decodes the state in which two of the flag signals 22, 23, and 24 are at H level, and an address in a memory area to which data is being written has not reached the highest address in the memory area. Therefore, the circuit 30 can notify a transfer source of overflow in the buffer memory before it does overflow, thereby aborting transfer of write data. As a result, loss of write data is avoided.

For example, assume that the flag signals 23 and 24 are at H level, and a write address reaches 47 before the highest address 52 by five in a memory area 1a to which data is being written. In order to decode this state, the overflow occurrence detection circuit 30 comprising decoders is set as shown in FIG. 2 to detect occurrence of overflow in advance, whereby loss of write data can be avoided.

Thus, in accordance with the third embodiment, a write address input to the buffer memory is decoded cell by cell, thereby setting each of the flag registers, a read address input to the buffer memory is decoded cell by cell, thereby setting each of the flag reset registers, whose outputs reset flag registers, respectively, the state in which outputs of the flag registers are at H level except one for a cell, and a write address of the cell has not reached the highest address is decoded. Thereby, overflow is detected. In addition, when outputs of the flag registers are all at L level, pseudo data is transferred to the transfer destination. Therefore, presence/absence of data in the buffer memory can be detected for each cell. In addition, use of the buffer memory control device in transfer control of data improves efficiency and prevents wrong data from being transferred. Besides, it is possible to detect overflow in advance.

Figure 5:
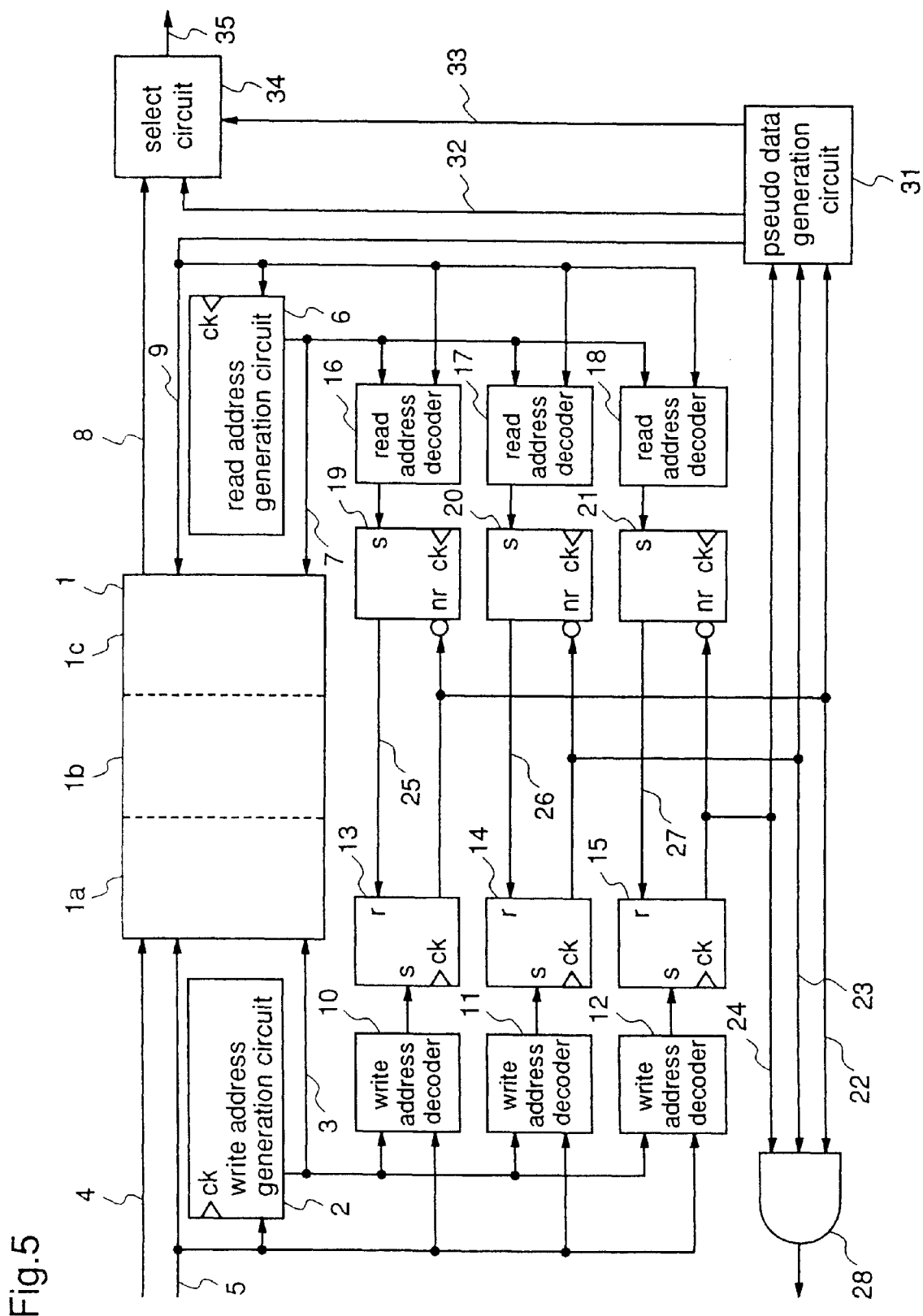
FIG. 5 is a block diagram showing another construction of the buffer memory control device of the third embodiment.

Further, as shown in FIG. 5, an overflow occurrence notification circuit may include the AND circuit 28 shown in FIG. 1. In this case, if addresses of the write address decoders 10, 11, and 12 are set at the highest addresses in the corresponding memory areas 1a, 1b, and 1c, for example, 52, 105, and 158, although occurrence of overflow cannot be detected in advance, presence/absence of data in the buffer memory can be detected for each cell, whereby transfer of wrong data can be avoided. Therefore, if they are set at 47, 100, and 153, overflow can be detected in advance, and simultaneously, only when outputs of the flag registers of two of the memory areas 1a, 1b, and 1c are at H level, it is possible to read data from a memory area.

Embodiment 4

In this fourth embodiment, a match between a write address in a buffer memory and arbitrary data set in an address setting register, and a match between a read address in the buffer memory and arbitrary data set in an address setting register are detected, thereby setting or resetting plural flag registers of memory areas, the state in which outputs of these flag registers are H except one of a flag register and a write address in a memory area of the flag register is about to overflow is detected by decoding the write address and the set data, the buffer memory is made readable when at least one of outputs of these flag registers is H, thereby detecting overflow in the buffer memory in advance before it does occur, and the buffer memory is divided into cells of an arbitrary number to detect presence/absence of data in the buffer memory for each cell.

Figure 6:
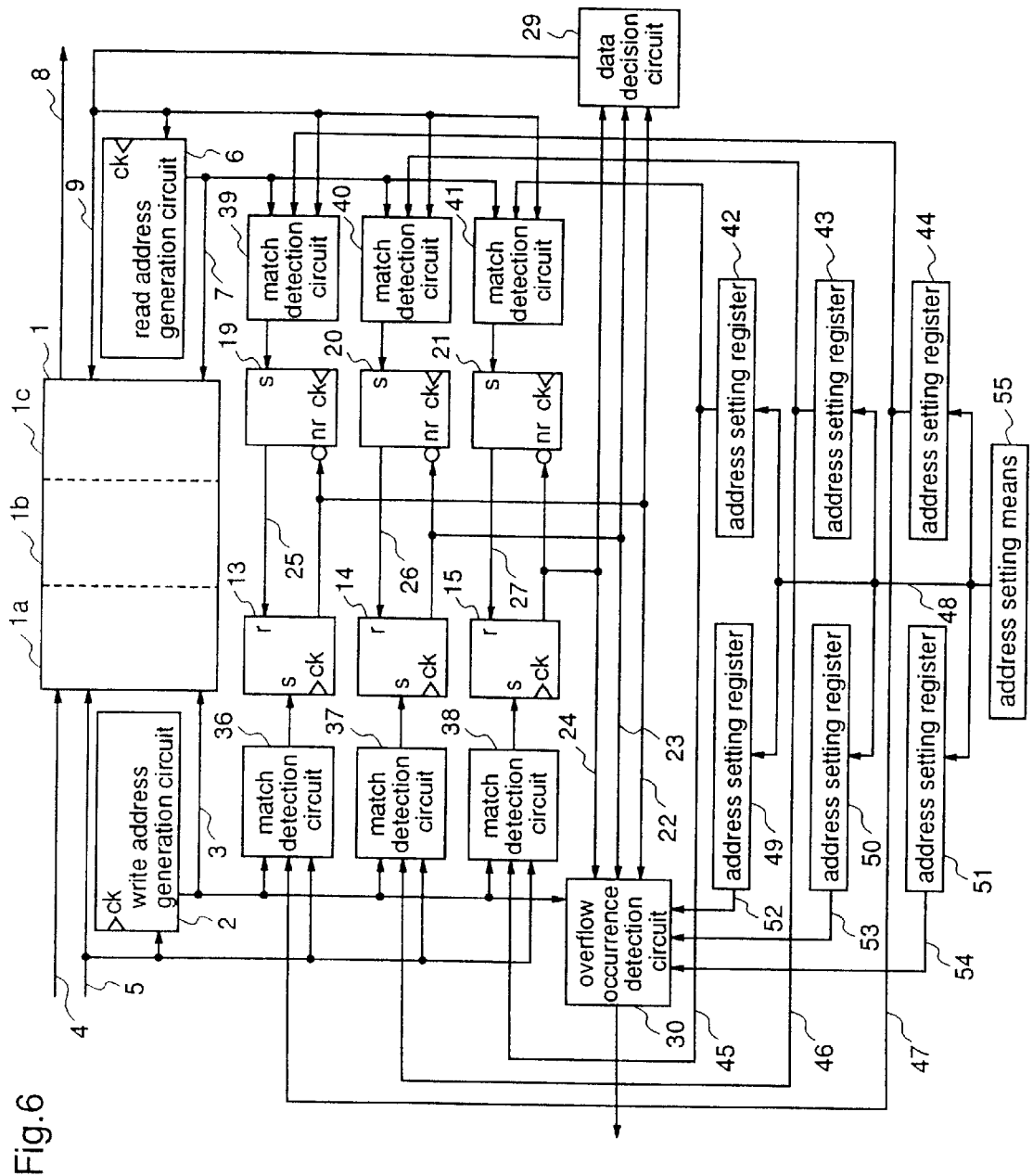
FIG. 6 is a block diagram showing a construction of a buffer memory control device of a fourth embodiment of the present invention.

FIG. 6 is a block diagram showing a construction of a buffer memory control device according to a fourth embodiment of the present invention.

In the figure, a buffer memory 1, a write address generation circuit 2, a write address 3, write data 4, a write enable signal 5, a read address generation circuit 6, a read address 7, read data 8, a read enable signal 9, flag registers 13~15, flag rest registers 19~21, flag signals 22~24, flag reset signals 25~27, a data decision circuit 29, and an overflow occurrence detection circuit 30 are virtually identical to those of the corresponding parts shown in FIG. 2 of the second embodiment. Match detection circuits 36~38 each includes an exclusive-OR circuit or the like, and are used for detecting matches between the write address 3 and addresses set in the address setting registers. Match detecting circuits 39~41 each includes an exclusive-OR circuit or the like, and are used for detecting matches between the read address 3 and addresses set in the address setting registers. Address setting registers 42~44 have match addresses detected by the corresponding match detection circuits 36~41, respectively. Data 45~47 is set by the address setting registers 42~44, respectively. Address setting registers 49~51 respectively have an address set by the overflow detection circuit 30. Externally input data 48 is set by the address setting registers 42~44 and 49~51. Address setting means 55 includes a CPU or the like and is used for setting the externally input data 48.

Operation of the buffer memory control device thus constructed will now be described.

Referring to FIG. 6 again, the buffer memory 1, when the write enable signal 5 is at L level, writes write data 4 onto the write address 3 output from the write address generation circuit 2 in synchronization with a write clock (not shown).

The write address generation circuit 2 sequentially outputs addresses 0~158 starting with 0 in synchronization with the write clock when the write enable signal 5 is at L level.

The address setting registers 42, 43, and 44 are respectively set by the externally input data 48 from the address setting means 55 and indicate the highest addresses in the corresponding memory areas 1a, 1b, and 1c, respectively. The match detection circuits 36, 37, and 38, when the data 45, 46, and 47 respectively match the write address 3, and at the completion of writing to the highest addresses in the corresponding memories 1a, 1b, and 1c, output H level signals to the corresponding flag registers 13, 14, and 15, respectively, which set the flag signals 22, 23, and 24 to be H level.

Meanwhile, the buffer memory 1, when a read enable signal 9 is at L level, reads read data 8 from an read address 7 output from the read address generation circuit 6 in synchronization with a read clock (not shown).

The read address generation circuit 6 sequentially outputs addresses 0~158 starting with 0 when the read enable signal 9 is at L level.

As described above, the address setting registers 42, 43, and 44 have the highest addresses in the corresponding memory areas 1a, 1b, and 1c, for example, 10, 110, and 158, set therein. The match detection circuits 39, 40, and 41, when the data 45, 46, and 47 respectively match the read address 7, and at the completion of reading from the highest addresses in the corresponding memories 1a, 1b, and 1c, output H level signals to the corresponding flag reset registers 19, 20, and 21, respectively.

Thereby, the flag reset registers 19, 20, and 21 are set. The registers 19, 20, and 21 output the flag reset signals 25, 26, and 27 to the corresponding flag registers 13, 14, and 15 at H level, respectively, until they are reset, and then enter L level.

The data decision circuit 29 outputs the read enable signal 9 when one or more of the flag signals 22, 23, and 24 are at H level.

Thus, the data decision circuit 29 allows data to be read from the buffer memory 1 only when one or more of the flag registers 22, 23, and 24 are at H level, thereby allowing transfer for each of arbitrary cells set in the set registers 42~44 externally. As a result, loss of cell data can be avoided.

The overflow occurrence detection circuit 30 including a decoder is set so that it decodes the state in which two of the flag signals 22, 23, and 24 are at H level, and an address in a memory area to which data is being written has not reached the highest address in the memory area, that is, it decodes the state in which two of the flag signals are at H level and a write address to which data is being written matches one of values of the address setting registers 49~51 set by the externally input data 48. In addition, the address setting registers 49~51 have addresses before the highest addresses in the corresponding memory areas 1a, 1b, and 1c set therein, respectively. Thereby, overflow of the buffer memory can be avoided in advance.

For example, in case of the highest addresses 40, 110, and 158 in the memory areas 1a, 1b, and 1c, the data 52~54 is set at 35, 106, and 153, respectively. Thereby, the overflow occurrence detection circuit (decoder) 30 can detect overflow in the buffer memory 1 for each arbitrary cell in advance.

Thus, in accordance with the buffer memory control device of the fourth embodiment, a match between a write address and arbitrary data set in a register, and a match between a read address and arbitrary data set in a register are detected, thereby setting or resetting plural flag registers of memory areas, the state in which outputs of these flag registers are H except one of a flag register, and a write address in the memory area of the flag register is about to overflow is detected by decoding the write address and the set data in the address setting register, and the buffer memory is made readable when at least one of outputs of these flag registers is H. Thereby, overflow in the buffer memory can be detected in advance before it does occur, and simultaneously, use of the buffer memory control device in transfer control of data improves efficiency. In addition, it is possible to divide the buffer memory into cells of arbitrary number, and detect presence/absence of data in the buffer memory for each of the divided cells.

Figure 7:
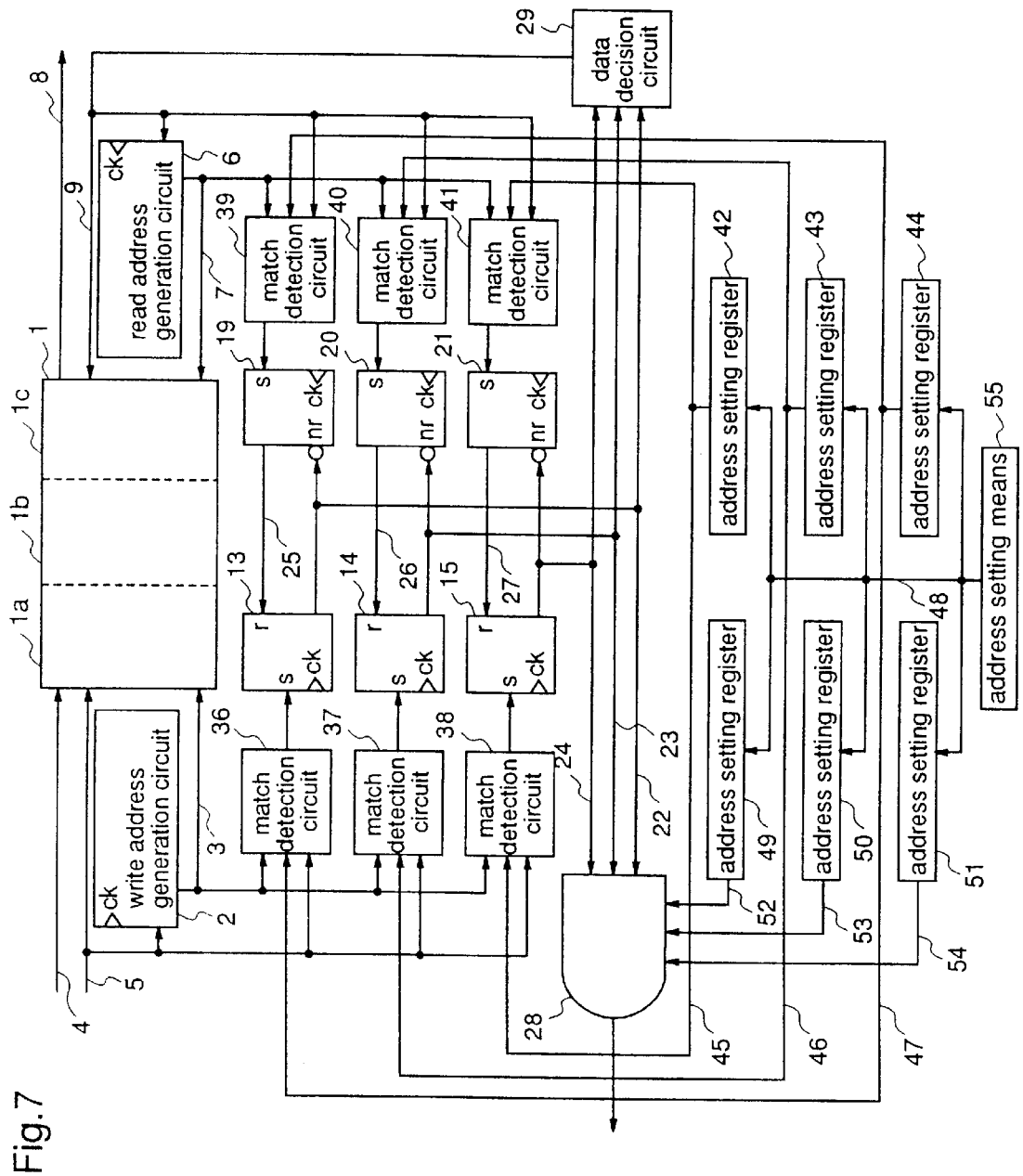
FIG. 7 is a block diagram showing another construction of the buffer memory control device of the fourth embodiment.
Figure 8:
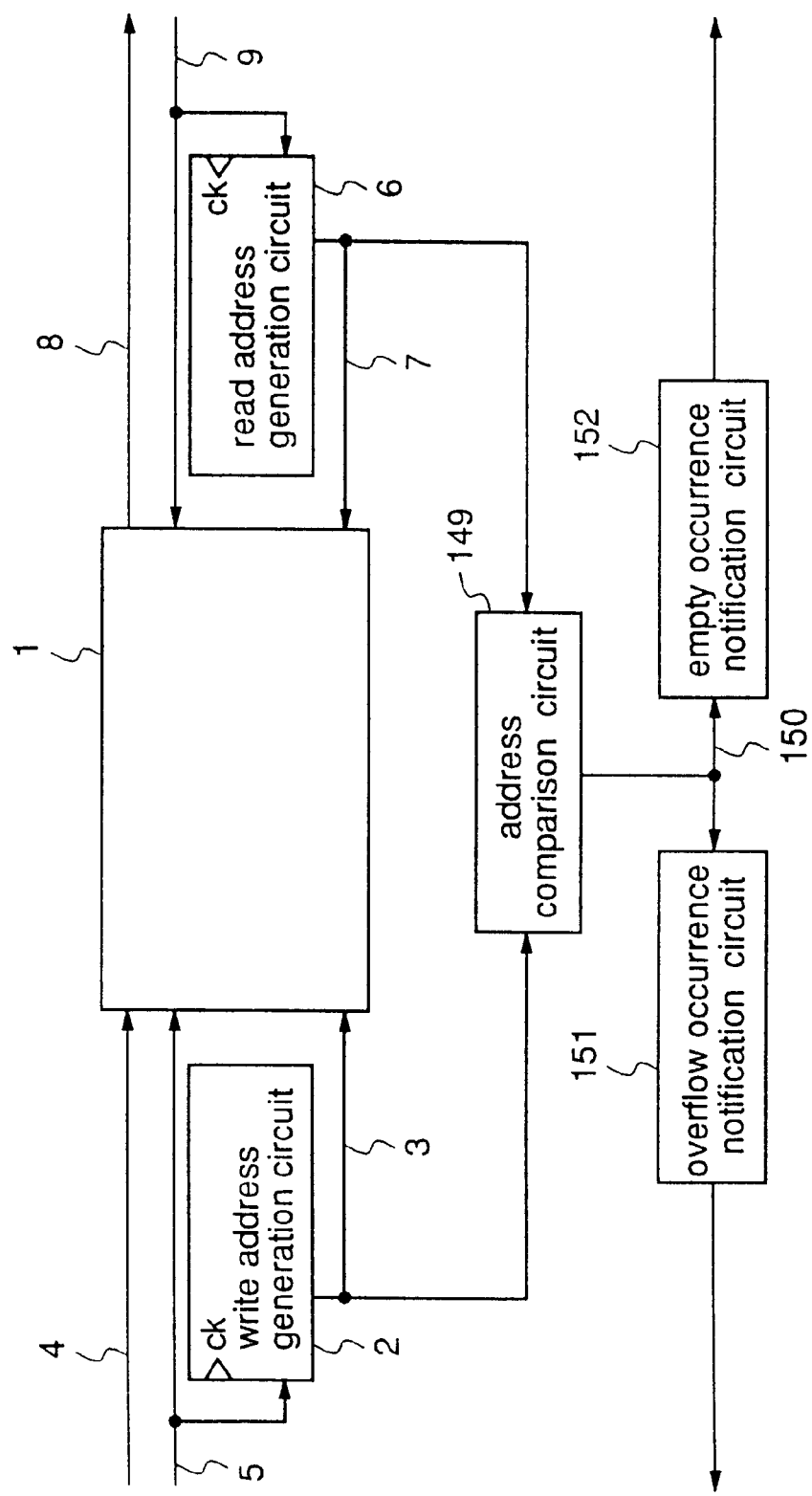
FIG. 8 is a block diagram showing a structure of a prior art buffer memory control device.
Figure 9:
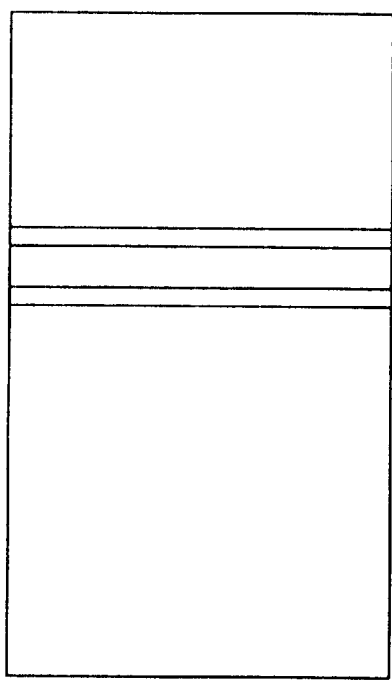
FIGS. 9(a) and 9(b) are diagrams showing detection of overflow and underflow of the prior art buffer memory control device, respectively.
Figure 9:
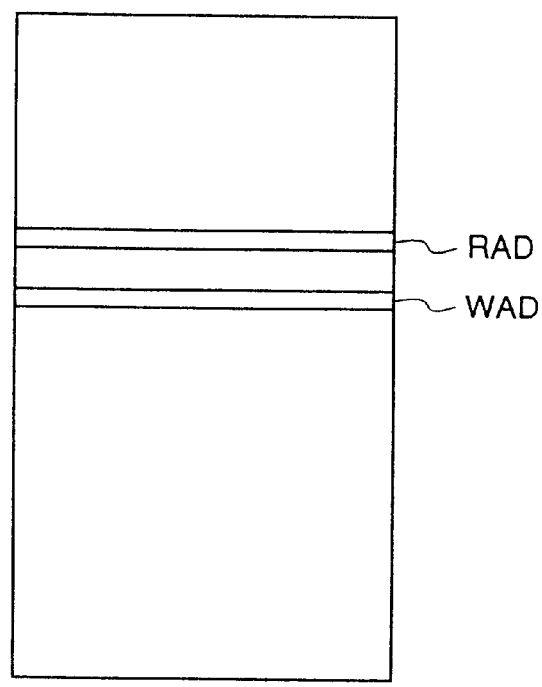
Figure 10:
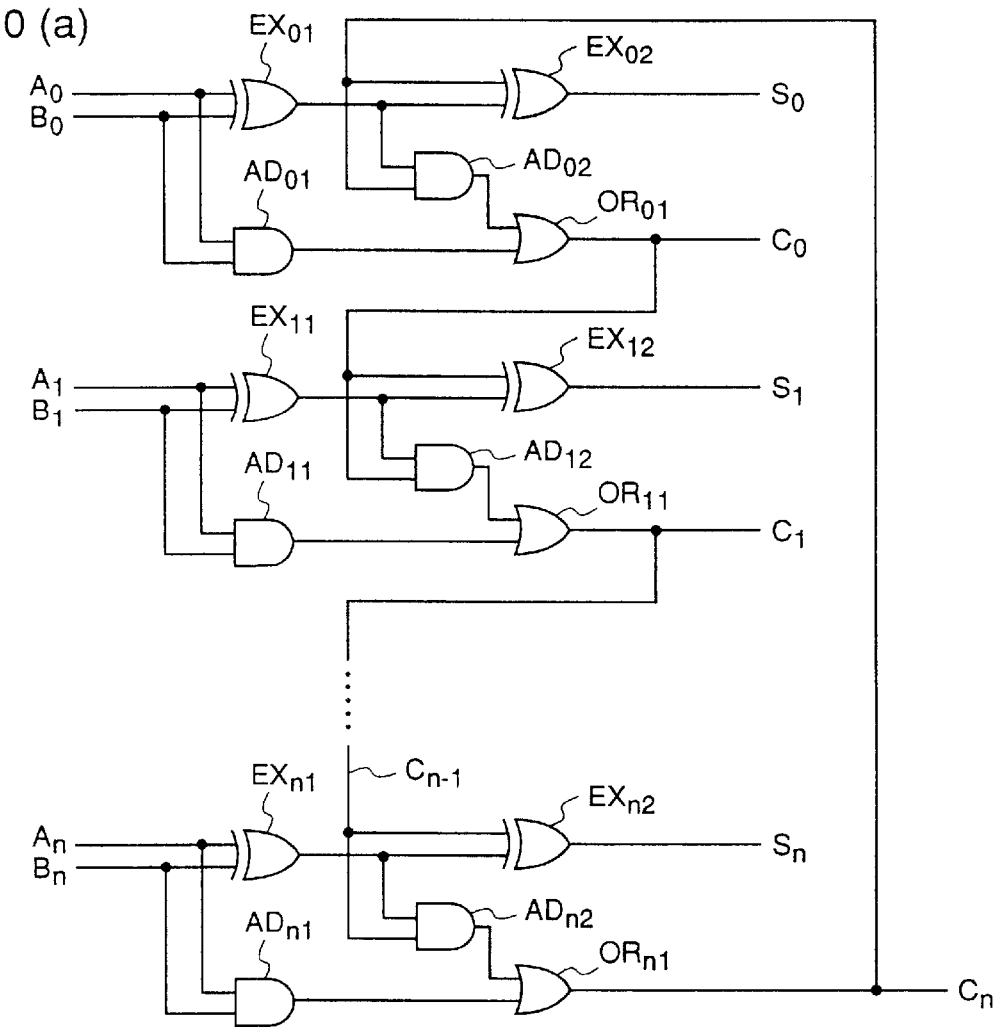
FIGS. 10(a)–10(c) are diagrams showing an address comparison circuit, an overflow occurrence notification circuit, and an empty occurrence notification circuit, respectively, of the prior art buffer memory control device.
Figure 10:
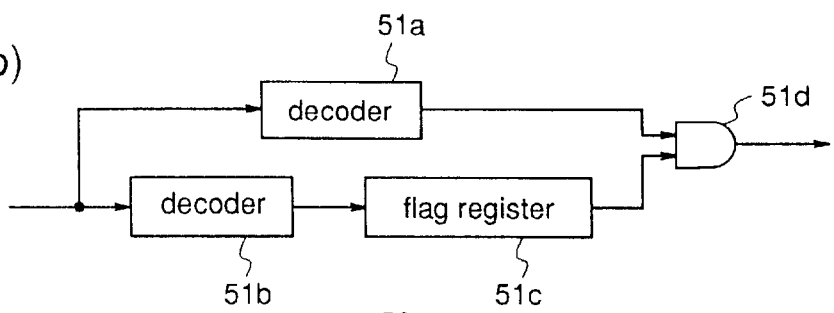
Figure 10:
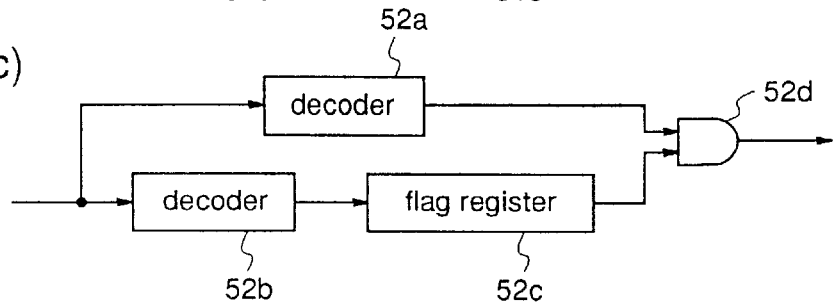
Figure 11:
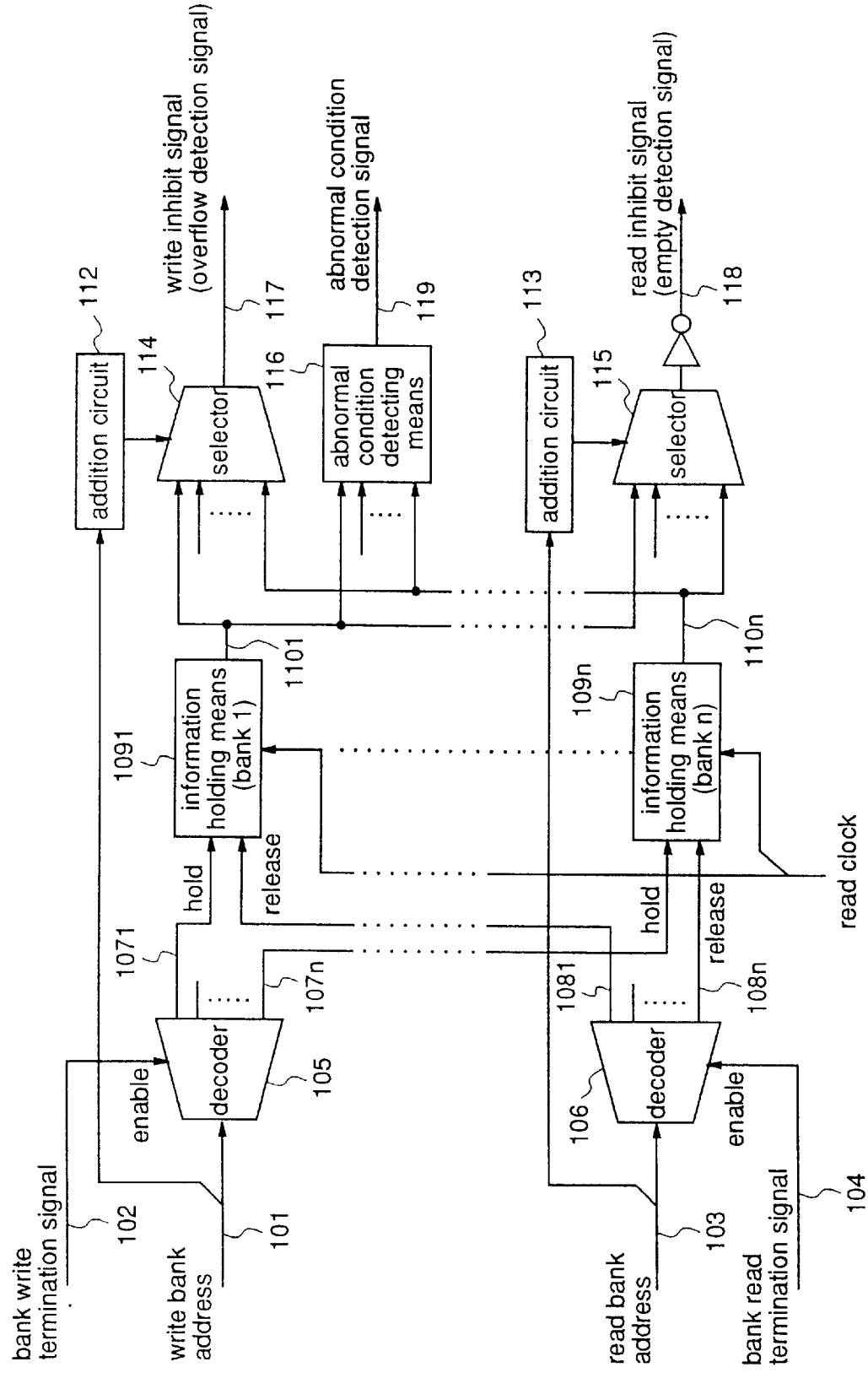
FIG. 11 is a diagram showing a construction of a prior art cell buffer control circuit.

Beside, as shown in FIG. 7, the overflow occurrence notification circuit may include the AND circuit 28 shown in FIG. 1. In this case, if addresses of the address setting registers 49, 50, and 51 are set at 40, 110, and 158 as the highest addresses in the corresponding memory areas 1a, 1b, and 1c, then presence/absence of data in the buffer memory can be detected for each of the divided cells, although occurrence of overflow cannot be detected in advance. Therefore, if addresses of the registers 49, 50, and 51 are set at 35, 106, and 153, overflow can be detected in advance, and the same effects as provided by the fourth embodiment are obtained.

Further, in the buffer memory control device, increases in the number of the flag registers, the flag reset registers, the match detection circuits, and the address setting registers, will result in memory areas of a larger arbitrary number, and for each of the resulting divided cells, data transfer and detection of overflow in advance can be carried out.

Still further, in a case where values of the match detection circuits are respectively set at 158, presence/absence of overflow can be detected without dividing a buffer memory, that is, assuming that the whole buffer memory is one memory area.

What is claimed is:

1. A buffer memory control device comprising:
a buffer memory which is divided into memory areas in cell units each consisting of plural pieces of data by addresses;
a write address generation circuit for outputting a write address of the buffer memory;
a read address generation circuit for outputting a read address of the buffer memory;
a first register for decoding the write address, thereby outputting a flag signal indicating a write address before completion of writing data for each cell;
a data decision circuit for deciding presence/absence of cell unit data in the buffer memory and performing read control of the buffer memory on the basis of the flag signal;
a second register for decoding the read address, thereby indicating completion of reading data for each cell and outputting a flag reset signal for resetting the flag signal; and
an overflow occurrence notification circuit for notifying a transfer source of overflow in the buffer memory on the basis of the flag signal,
the data decision circuit performing read control of the buffer memory, and notifying a transfer source that transfer of write data should be aborted before the buffer memory overflows, and data being transferred for each cell, thereby avoiding loss of data.

2. The buffer memory control device of claim 1 further comprising:
a pseudo data generation circuit for receiving a flag signal as an input, performing read control of the buffer memory and outputting a pseudo data selection signal and pseudo data in cell units when there is no cell unit data in the buffer memory; and
a select circuit for selecting one of the pseudo data and the read data output from the buffer memory on the basis of the pseudo data selection signal.

3. The buffer memory control device of claim 1 further comprising:
a register which is externally set to present an address value of the buffer memory;
a first match detection circuit for detecting a match between the value of the register and the write address; and
a second match detection circuit for detecting a match between the value of the register and the read address,
the buffer memory being divided into memory areas in arbitrary units.

4. A buffer memory control device comprising:
a buffer memory which is divided into memory areas in cell units each consisting of plural pieces of data by addresses;
a write address generation circuit for outputting a write address of the buffer memory;
a read address generation circuit for outputting a read address of the buffer memory;
a first register for decoding the write address, thereby outputting a flag signal indicating one of a write address at the completion of writing cell unit data and a write address before completion of the writing;
a data decision circuit for deciding presence/absence of cell unit data in the buffer memory and performing read control of the buffer memory on the basis of the flag signal;
a second register for decoding the read address, thereby indicating completion of reading data for each cell and outputting a flag reset signal for resetting the flag signal; and
an overflow occurrence detection circuit for receiving a flag signal and a write address as inputs and notifying a transfer source that transfer of write data should be aborted before overflow occurs on the basis of the flag signal and the write address, the data decision circuit performing read control of the buffer memory, and notifying a transfer source that transfer of write data should be aborted before the buffer memory overflows, and data being transferred for each cell, thereby avoiding loss of data.

5. The buffer memory control device of claim 4 further comprising:

a pseudo data generation circuit for receiving a flag signal as an input, performing read control of the buffer memory and outputting a pseudo data selection signal and pseudo data for each cell when there is no cell unit data in the buffer memory; and a select circuit for one of the pseudo data and the read data output from the buffer memory on the basis of the pseudo data selection signal.

6. The buffer memory control device of claim 4 further comprising:

a register which is externally set to present an address value of the buffer memory;

a first match detection circuit for detecting a match between the value of the register and the write address; and a second match detection circuit for detecting a match between the value of the register and the read address, the buffer memory being divided into memory areas in arbitrary units.

\* \* \* \* \*